Patented July 27, 1937

2,087,936

UNITED STATES PATENT OFFICE 2,087,936

METHOD OF BREAKING EMULSIONS

Abraham M. Herbsman, Huntington Park, Calif., assignor to Industrial Patents, Ltd., Los Angeles, Calif., a corporation of California No Drawing. Application February 24, 1936, Serial No. 65,433

1 Claim. (Cl. 196—4)

The present invention relates to the treatment of emulsion oils and will be fully understood from the following description.

The emulsion oils capable of being treated in accordance with the present invention may suitably be any type of oil and water emulsion occurring in nature or in refinery practice, regardless of whether oil or water be the continuous phase. The invention is especially adapted, however, to the treating of petroleum oil or crude oil emulsion for the purpose of breaking the emulsion and separating the water from the petroleum.

The petroleum oil producing strata in most localities have water or brine associated with the oil. When the brine is agitated with the oil as is commonly done by pumps, particularly ineffectively operating pumps, an oil and water emulsion is formed. Sometimes the agitation of oil and brine in the well itself causes the formation of an emulsion before the oil is removed from the well. The brine usually forms the dispersed phase of the emulsion and is distributed in the oil as particles varying in size from large drops to those of microscopic size.

The presence of emulsion in petroleum oil is undesirable because the wet oils or oil-containing emulsion cannot be refined or distilled with the water in them. The presence of water in the oil undergoing distillation causes the stills to froth and the froth contaminates the distillate. Accordingly, the refineries and pipe line companies refuse to buy oil which has more than a predetermined amount of oil and water emulsion in it.

The conventional process for breaking such emulsion contemplates subjecting the emulsion to the action of a substance or to a compound which acts on the emulsion in such a manner that the water of the emulsion will separate from the oil when the emulsion is allowed to remain in the quiescent state at a suitable temperature after treatment. In my United States Letters Patent No. 1,921,751 issued August 8, 1933, and No. 1,931,122 issued October 17, 1933, I have disclosed and claimed two different processes for the chemical treatment of petroleum emulsions for the purpose of separating the oil therefrom.

The present invention contemplates the provision of a method of breaking down petroleum emulsion by the introduction into the emulsion or the chemical production in the emulsion itself of free, activated or nascent hydrogen. I have found that with some types of emulsions the use of hydrogen is effective in breaking the emulsion with an equal or greater efficiency than any other available method and at a much lower cost.

Where the process of my invention is performed by the use of free hydrogen, this is preferably injected into the emulsion either in the well, or in a pipe line carrying the same, or in a tank in which the emulsion is stored, the hydrogen being injected in the form of small bubbles and preferably mixed thoroughly with the emulsion. This mixing process may be practically entirely performed by the emission of the hydrogen through small orifices in pipes laid in the container in which the emulsion is disposed, so that the hydrogen becomes finely divided into very small bubbles immediately upon its introduction into the emulsion. The effect of these jets of hydrogen also is to set-up currents and turbulence in the body of the emulsion thereby effecting a thorough mixing of the hydrogen with the emulsion.

While this invention embraces the introduction of free hydrogen into the emulsion, I have found that in most instances optimum results are obtained by the use of nascent hydrogen produced right in the emulsion itself or in close proximity to it or by activated hydrogen. The latter term refers to hydrogen used in conjunction with a catalyst which renders the hydrogen more active.

To perform the method of my invention by the use of nascent hydrogen, I preferably introduce directly into the emulsion one of the metallic hydrides, such as sodium hydride, potassium hydride or calcium hydride. Alternately, metallic sodium or metallic potassium or metallic calcium or some alloy or amalgam of metal such as sodium amalgam or the lead alloy of sodium or a colloidal form of metallic sodium, potassium or calcium may be so used. The introduction into the emulsion of any of the elements or compounds named causes it to react with the water in the emulsion thus liberating hydrogen which at the moment of its liberation is in a nascent form and highly active. In the performance of my process it is desirable that the chemical agent thus added to the emulsion be quickly and widely dispersed through the emulsion and for this reason a rapid and complete mixing of the agent with the emulsion by some suitable means of agitation is preferable.

In cases where a certain amount of water or brine has settled out of the emulsion and is disposed in an underlayer one of the chemical agents above-mentioned may be introduced into this lower layer of water so that the hydrogen thus produced by the reaction of the chemical agent with the water will rise upwardly to permeate and treat the body of the emulsion superimposed thereover.

Another mode of performing the method of my invention so as to produce nascent hydrogen at widely diffused points throughout the emulsion to be treated is as follows: A finely divided metal such as zinc or the like or a metal in a colloidal form is introduced into and thoroughly mixed with the emulsion following which an aqueous solution of an acid such as muriatic acid is then disseminated throughout the emulsion. This results in the production of nascent hydrogen in minute quantities widely disseminated throughout the emulsion, and causes the flocculation of the dispersed phase of water thereby releasing the oil and permitting the oil and water to separate out and stratify.

A still further mode of introducing nascent hydrogen into the emulsion to be treated in performing the method of my invention includes the electrolysis of water contained in the emulsion itself or of the layer of water generally underlying the emulsion thereby causing hydrogen to be produced at the cathode. In following this mode of operation the water is preferably first made slightly alkaline by the introduction of caustic soda or caustic potash. The electrodes used are preferably both of nickel and are suspended in the water underlying the emulsion or in the emulsion itself and are connected to terminals of a suitable source of electric current to effect a potential between the electrodes of substantially 110 volts and adjusted to provide a flow of at least 4 amperes. The electrolysis is, of course, facilitated by the increased ionization due to the introduction of the alkali.

While I prefer in the use of two chemical agents to react in the emulsion to produce hydrogen, to introduce these separately into the emulsion so as to secure as wide dissemination of the first before the second is introduced it to be understood that simultaneous introduction of these agents into the emulsion is considered as coming within the scope of this invention. It is also to be noted that with our present understanding of the state of the art, any method for the generation of hydrogen within the emulsion or directly adjacent thereto is included in the patentable scope of my invention here set forth for the breaking of emulsions of crude oil, and the claim appended hereto should be construed accordingly.

It is further understood that this process need not be necessarily used alone but may be combined with other processes for breaking emulsions such as the use of sulfonated compounds, rays of short wave lengths, et cetera.

The introduction of a chemical agent into the emulsion which reacts with the water to produce hydrogen may be effected by providing a chamber in which such an agent is contained so that an intimate contact of emulsion with the agent will be had and so as to prevent contact of the agent with air which would deteriorate this by causing excessive oxidation. If desired, these chambers may be kept heated by the usual means of steam-jacketing or steam coils.

The use of a catalyst for activating the hydrogen, whether the latter be either free or nascent hydrogen, is accomplished in my invention either by the provision of finely divided nickel or nickel oxide or other salts of nickel in the same area where the hydrogen mixes with the emulsion or, on the other hand, by the mixture of colloidal nickel or solutions of salts of nickel, such as formate, acetate, oxylate, tartrate, or the salts of iron, copper and cobalt directly in the emulsion. As much of the catalyst as possible is recovered from the brine after this has been separated out from the emulsion.

What I claim is:

The method of treating a petroleum emulsion to separate the oil and water therein, said method being characterized by the introduction into and mixing with said emulsion of a quantity of hydrogen, and activating said hydrogen in the presence of said emulsion with a catalyst from the group consisting of metallic iron, cobalt and nickel and the oxides, formates, acetates, oxylates and tartrates of said metals.

ABRAHAM M. HERBSMAN.